Feb. 5, 1963 M. J. SHOEMAKER 3,076,302
LAMINATED FILTER
Filed Oct. 31, 1960 2 Sheets-Sheet 1
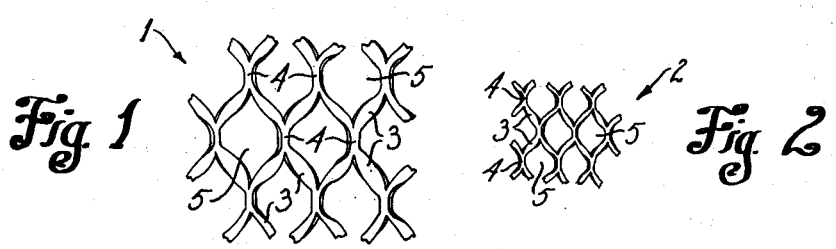
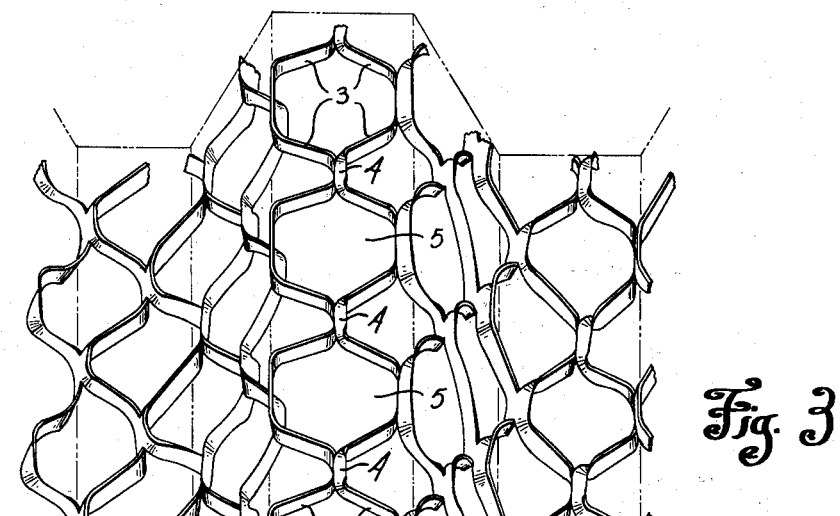
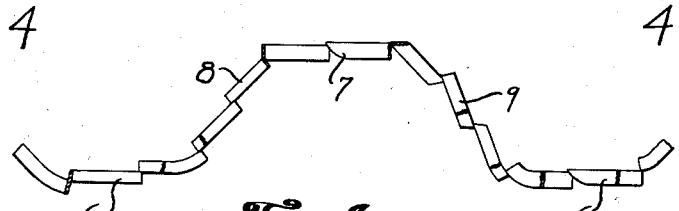
INVENTOR.
MILTON J. SHOEMAKER
BY
Andrus & Starke
Attorneys Feb. 5, 1963 M. J. SHOEMAKER 3,076,302
LAMINATED FILTER
Filed Oct. 31, 1960 2 Sheets-Sheet 2

INVENTOR.
MILTON J. SHOEMAKER
BY
*Andrus & Starke*
Attorneys

3,076,302
LAMINATED FILTER
Milton J. Shoemaker, Madison, Wis., assignor to Research Products Corporation, Madison, Wis., a corporation of Wisconsin
Filed Oct. 31, 1960, Ser. No. 66,228
5 Claims. (Cl. 55—487)

This invention relates to a laminated filter wherein the filter body is formed of layers of slit and expanded metal foil secured together and having a coating of suitable tacky material which retains air-borne dust particles in the process of filtration as air passes through the filter body in a direction generally normal to the plane of the layers.

Filter bodies of this type have a wide variety of uses in air conditioning, window ventilating, kitchen exhaust units, and many other applicances and structures involving the movement of air. The rapidly expanding market for such equipment has resulted in a demand for thousands of different sizes and shapes of air filters, making it impractical for dealers to carry every variety in stock and thereby resulting in intolerable delays waiting for a special production run at the factory.

Panel type filter bodies having the layers of expanded foil secured together throughout their coextensive surfaces have been developed which can be furnished in large sheet form and cut to size with a knife for the customer, or which a user may purchase and cut to size for his use. Domed and other shaped filters of this general type are also known. Such filters are disclosed in copending application Serial No. 771,330 and assigned to a common assignee. However, such filters are generally somewhat flexible and lack the rigidity desired for some applications. Supporting grids are therefore necessary. The rigidity cannot be increased by adding layers to the filter without increasing the air resistance. For example, an increase in thickness of the filter from 3/16" to 5/8" has been found to increase the resistance to air passing through the filter at 350 feet per minute by 3 1/3 times. This high resistance would preclude the use of such a filter for most commercial purposes.

Furthermore, an increase in the number of layers beyond a practical limit does not give a proportionate increase in filtering action.

The present invention provides a type of filter which has greatly increased rigidity and also filtering action without unduly increasing the number of layers. While the invention is particularly directed to providing a rigid filter body which is manually trimmable with scissors or the like, the same body may be framed and shaped in manufacture for original equipment installations.

In carrying out the invention the layers of the filter body are strengthened by one or more deformed spacing sheets of heavier stock and which are similarly slit and expanded. The deformation of the added sheets takes a form that provides an increased rigidity or beam effect for the filter which is substantially greater than would be obtained if the expanded sheet were flat. The deformation provides a series of parallel flat-walled channels or corrugations throughout the sheet.

The added deformed sheet is bound to the thinner foil outer layers and in effect adds substantial rigidity depending upon the depth of the corrugations employed. When desired, two or more such deformed sheets may be employed.

By incorporating the added deformed sheet as a sandwich filler in the filter body it is possible to obtain a very substantial increase in filtering action without increasing the total number of foil layers employed. However, the filter can be produced in any desired thickness, and has been found to possess excellent performance characteristics as indicated by: Low resistance to passage of air, high efficiency in removing air-borne particles, high dust holding capacity, lightness of weight and ease of handling, durability and capability of withstanding repeated washings, and high structural strength.

As more fully described hereinafter, all of the layers may be secured together by a bonding agent. This agent may include almost any of the synthetic resins such as a thermoplastic vinyl plastic composition, or a thermosetting phenolic plastic or an epoxy resin composition.

The accompanying drawings illustrate the best mode presently contemplated for carrying out the invention.

In the drawings:

FIGURE 1 is a fragmentary detail perspective view of the relatively rigid expanded metal sheet from which the spacing layer or layers of the sandwich are constructed;

FIG. 2 is a view similar to FIGURE 1 of the relatively flexible expanded metal foil from which the outer layers of the sandwich are constructed, and showing the difference in dimensions relative to the spacing sheet;

FIG. 3 is a fragmentary perspective view of an expanded sheet similar to that shown in FIGURE 1 which has been deformed to have flat-walled corrugations;

FIG. 4 is a fragmentary end view of the deformed sheet of FIG. 3 taken on line 4—4 of FIG. 3;

Figure 5:
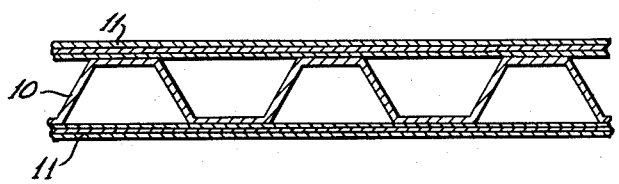
FIG. 5 is a fragmentary end elevation of a sandwich formed in accordance with the invention with some details removed for purposes of clarity.

As shown in the drawings, each layer of the filter is made up of expanded generally non-corrosive metal, which may be copper or aluminum, the latter being preferable. The heavier gauge metal is shown in FIGURE 1 and will hereinafter be referred to as sheets 1, while that of thinner gauge is shown in FIG. 2 and will be referred to as foil 2. Sheets 1 are preferably .01" gauge, in thickness, although this may vary due to strength requirements. Foil 2 is preferably of .003" gauge, although foil with thicknesses from about .001" to .006" may be employed.

Both the sheet and foil layers are initially flat and comprise a slit and expanded open-mesh network of webs 3 which extend between and connect channel-like baffle elements 4. Both the webs and baffles are inclined at an angle to the general plane of the layer. Webs 3 have considerable curvature or are bent along the lines of junction with the baffles 4. These terminal portions of webs 3 provide flange-like sides of baffles 4, the width of the latter usually being equal to approximately twice the width of the webs. The generally twisted webs and parallel baffles are continuous to form the layer, and define a plurality of six-sided openings 5.

A machine for fabricating the expanded metal foil and sheet is described in Patent No. 2,611,298. As more fully explained therein, the dimensions of the expanded material depend upon the distance between the course of slits cut by the machine and the degree of expansion.

The openings 5 in sheet 1 are considerably larger than the openings in foil 2.

For purposes of the invention, sheet 1 is suitably formed into the corrugated member shown in FIGS. 3 and 4. In accordance with the invention, the corrugated configuration includes flat outer walls or nodes 6 and 7, respectively, which are alternately disposed in a pair of spaced planes extending parallel to the general extent of the sheet. Walls 6 and 7 are joined by side walls 8 and 9 which may be generally planular or slightly curved depending upon the particular application. The width of each of the walls 6 and 7 is slightly greater than the diameter or width of one core opening 5. In forming the corrugations, the baffles 4 which are disposed in walls 6 and 7 are twisted so that they are in the general plane of the sheet, for purposes to be described. See FIG. 3.

According to the invention, the filter sandwich body of FIG. 5 includes on each side of a corrugated sheet layer 10 a plurality of flat foil layers 11. While only three foil layers are shown on each side of the filter, substantially more than this are often used. The foil layers 11 are secured together into a unitary stack, such as by a suitable bonding agent, sewing, stapling, or ultrasonic welding. When a bonding agent is used, the engaging elements of adjacent layers of the stack are cemented directly together. If the elements do not quite touch, the bonding agent bridges the space therebetween.

In forming the sandwich it may be desirable to preliminarily compact foil layers 11 into panels by applying sufficient pressure to cause them to interlock and engage each other, as per Patent No. 2,829,733.

The foil layers, with or without compaction, are then assembled with the core. Here again, chemical bonding, sewing, stapling, ultrasonic welding or other suitable process may be employed to bind the entire assembly together. When chemical bonding is employed, the complete assembly is immersed in a liquid resin capable of hardening under the influence of temperature. In some instances, and depending upon the bonding agent employed, the immersion step may be replaced by spraying, vapor condensation or other processes.

Following immersion, the excess resin solution is removed by drainage while the assembly is in a horizontal position. The assembly is then subjected to light pressure and heat for the brief period required for the resin to set.

Since the walls 6 and 7 are flat, there is substantial bonding contact with the foil layer throughout. In addition, the flat baffles 4, being deformed so that they are in the general plane of the sheet and of the stack, provide substantially increased surface area for bonding.

It has been found that a 5/8" thick structure constructed according to FIG. 5 has a lower resistance to air passage and one-third more dust holding capacity than a 3/16" thick conventional expanded foil filter with no corrugated layers but the same number of foil layers.

Figure 6:
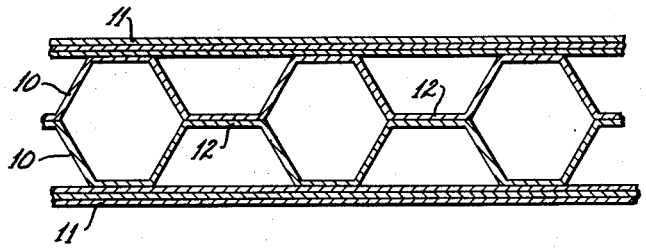
FIG. 6 is a fragmentary end elevation of a sandwich showing another form of the invention.

FIG. 6 shows an embodiment of the invention wherein a pair of corrugated sheet layers 10 are disposed between the flat foil layers 11. In this instance, the inner flat walls 12 of both layers 10 are parallel and coextensive and are bound together in abutting relationship, such as with a bonding agent. The horizontally flattened baffles of walls 12 will often overlap each other and further increase the bonding area.

Figure 7:
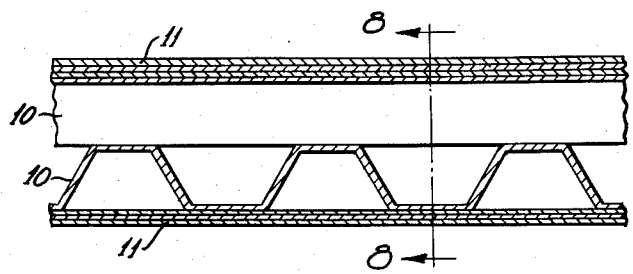
FIG. 7 is a fragmentary end elevation of a sandwich yet another form of the invention.
Figure 8:
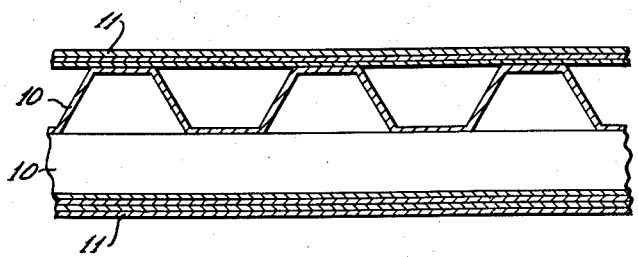
FIG. 8 is a section taken on line 8—8 of FIG. 7.

In the construction of FIGS. 7 and 8, a pair of corrugated sheet layers 10 are again utilized as a core, but with the corrugations of one sheet disposed at 90° from those of the other sheet.

The completed sandwich may take the shape of a flat filter body or panel or may be formed from the flat body into a dome-like or other curved structure.

The laminated filter of the invention has been found to be a highly rigid structure, due to the box beam effect, without requiring an overabundance of deformed heavy gauge layers. Such layers act as a truss which imparts structural strength to the sandwich and also provides added space whereby the dust holding capacity of the unit is substantially increased. The flat-walled corrugations serve to further increase the structural strength of the filter by providing added surface area for securement purposes. By disposing the baffles 4 in the plane of the filter, pickup of dust particles from the air passing through is facilitated.

Various modes of carrying out the invention are contemplated as being within the scope of the following claims particularly pointing out and distinctly claiming the subject matter which is regarded as the invention.

I claim:

1. A laminated air filter body of the class described, comprising a pair of spaced outer layers of expanded metal foil material, and a central core of expanded metal sheet material disposed between said outer layers, said core having corrugations with a plurality of flat outer walls disposed in a pair of spaced planes which are parallel to the general extent of said core and to the plane of the filter body, said walls including baffle elements therein which are bound to the respective adjacent outer layer.

2. A laminated air filter body of the class described comprising, a pair of spaced outer layers of expanded metal foil material of relatively light gauge, a central core of expanded metal sheet material of relatively heavier gauge than said outer layers and disposed therebetween, said layers and said core each having a plurality of web and baffle elements which interconnect to form a plurality of openings, the openings in said core being larger than the openings in said outer layers, and a plurality of corrugations in said core with the corrugations being constructed to provide a plurality of generally flat walls alternately disposed in each of a pair of spaced planes which are parallel to the general extent of said core and to the plane of the filter body, said walls being of a width greater than the width of the core openings and being bound to said outer layers.

3. The filter of claim 2 in which the said walls of the said core include baffles therein which are generally parallel to the plane of the filter to increase the binding surface area.

4. A laminated air filter body of the class described, comprising, a pair of spaced planular outer layers of expanded metal, a central core of expanded metal disposed between said layers, said layers and said core each having a plurality of web and baffle elements which interconnect to form a plurality of openings, said core comprising a plurality of sheets with each sheet having corrugations provided with a plurality of flat walls disposed in each of a pair of spaced planes which are parallel to the general extent of the core and to the plane of the filter body, said flat walls being of a width greater than the width of the core openings and also having a plurality of baffle elements disposed generally centrally thereof, said last named baffle elements extending generally in the plane of the filter, the flat walls of adjacent corrugated sheets being bound to each other and the flat walls of the outer corrugated sheets being bound to the said spaced outer layers.

5. A laminated air filter body of the class described, comprising, a pair of spaced outer layers of expanded metal foil material of relatively light gauge, a central core of expanded metal sheet material of relatively heavier gauge than said outer layers and disposed therebetween, said layers and said core each having a plurality of web and baffle elements which interconnect to form a plurality of openings, and a plurality of corrugations in said core with the corrugations being constructed to provide a plurality of generally flat walls alternately disposed in each of a pair of spaced planes which are parallel to the general extent of said core and to the plane of the filter body, said walls being of a width greater than the width of the core openings and being bound to said outer layers.

References Cited in the file of this patent

UNITED STATES PATENTS

| | | |
|---|---|---|
| 1,676,191 | Jordahl | July 3, 1928 |
| 1,883,715 | Greene | Oct. 18, 1932 |
| 1,895,642 | Preble | Jan. 31, 1933 |
| 1,941,450 | Sylvan | Jan. 2, 1934 |
| 2,405,716 | Schaaf | Aug. 13, 1946 |
| 2,929,464 | Sprouse | Mar. 22, 1960 |
| 2,989,145 | Goodloe | June 20, 1961 |

FOREIGN PATENTS

| | | |
|---|---|---|
| 310,492 | Switzerland | Dec. 16, 1955 |
| 774,969 | Great Britain | May 15, 1957 |